(12) United States Patent  
Muratov et al.

(10) Patent No.: US 11,101,067 B2
(45) Date of Patent: *Aug. 24, 2021

(54) WIRELESS POWER TRANSMITTER WITH SHIELDING STRUCTURE

(71) Applicant: Texas Instruments Incorporated, Dallas, TX (US)

(72) Inventors: Vladimir A. Muratov, Manchester, NH (US); John C. Rice, Milford, MI (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 266 days.

This patent is subject to a terminal disclaimer.

(21) Appl. No.: 16/212,906

(22) Filed: Dec. 7, 2018

(65) Prior Publication Data

US 2019/0115787 A1   Apr. 18, 2019

Related U.S. Application Data

(63) Continuation of application No. 14/980,212, filed on Dec. 28, 2015, now Pat. No. 10,186,904, which is a continuation of application No. 13/654,692, filed on Oct. 18, 2012, now Pat. No. 9,230,732.

(60) Provisional application No. 61/587,504, filed on Jan. 17, 2012.

(51) Int. Cl.
*H01F 27/36* (2006.01)
*H01F 38/14* (2006.01)
(Continued)

(52) U.S. Cl.
CPC ........... *H01F 27/363* (2020.08); *H01F 27/36* (2013.01); *H01F 38/14* (2013.01); *H02J 7/025* (2013.01);
(Continued)

(58) Field of Classification Search
CPC ............. H01F 38/14; H01F 27/36–363; B60L 53/12–126
See application file for complete search history.

(56) References Cited

U.S. PATENT DOCUMENTS 2,288,735 A * 7/1942 O'Connell ........... H05K 9/0039
343/841
5,360,941 A * 11/1994 Roes ................ G06K 19/07327
174/378
(Continued)

FOREIGN PATENT DOCUMENTS

| EP | 0817171 A2 | 1/1998 | |
|---|---|---|---|
| JP | 2012134374 A * | 7/2012 | ............. H01F 38/14 |
| WO | WO-2010129369 A2 * | 11/2010 | ................ H02J 7/02 |

OTHER PUBLICATIONS

Ott, "Noise Reduction Techniques in Electronic Systems," A Wiley-Interscience Publication, John Wiley & Sons, Second Edition, 1988 (9 pages).

*Primary Examiner* — Rexford N Barnie
*Assistant Examiner* — David A Shiao
(74) *Attorney, Agent, or Firm* — Michael A. Davis, Jr.; Charles A. Brill; Frank D. Cimino

(57) ABSTRACT

A wireless power transmitter can include a transmitting coil configured to wirelessly transmit power to a receiving coil. The wireless power transmitter can include a shield residing on a given side of a substrate spaced apart from the transmitting coil. The shield can be configured to filter an electric field induced by the transmitting coil.

13 Claims, 7 Drawing Sheets

(51) Int. Cl.
  *H02J 50/10*    (2016.01)
  *H02J 7/02*     (2016.01)
  *H01F 27/34*    (2006.01)
  *H02J 50/90*    (2016.01)

(52) U.S. Cl.
  CPC ........ *H02J 50/10* (2016.02); *H01F 2027/348* (2013.01); *H02J 50/90* (2016.02)

(56) References Cited

U.S. PATENT DOCUMENTS

| | | | |
|---|---|---|---|
| 7,339,120 B2* | 3/2008 | Notohara | H05K 9/009 |
| | | | 174/357 |
| 7,477,120 B2 | 1/2009 | Gu et al. | |
| 7,496,871 B2 | 2/2009 | Suaya et al. | |
| 7,759,940 B2 | 7/2010 | Forgang et al. | |
| 7,999,358 B2 | 8/2011 | Bakalski et al. | |
| 8,323,768 B2* | 12/2012 | Connelly | G01R 33/285 |
| | | | 428/137 |
| 2005/0104781 A1 | 5/2005 | Notohara et al. | |
| 2009/0096413 A1 | 4/2009 | Partovi et al. | |
| 2009/0308653 A1 | 12/2009 | Wu | |
| 2010/0081483 A1* | 4/2010 | Chatterjee | H01F 1/15333 |
| | | | 455/572 |
| 2012/0112552 A1 | 5/2012 | Baarman et al. | |
| 2013/0181535 A1* | 7/2013 | Muratov | H02J 50/90 |
| | | | 307/104 |
| 2014/0049212 A1* | 2/2014 | Sawa | H02J 7/025 |
| | | | 320/108 |

\* cited by examiner

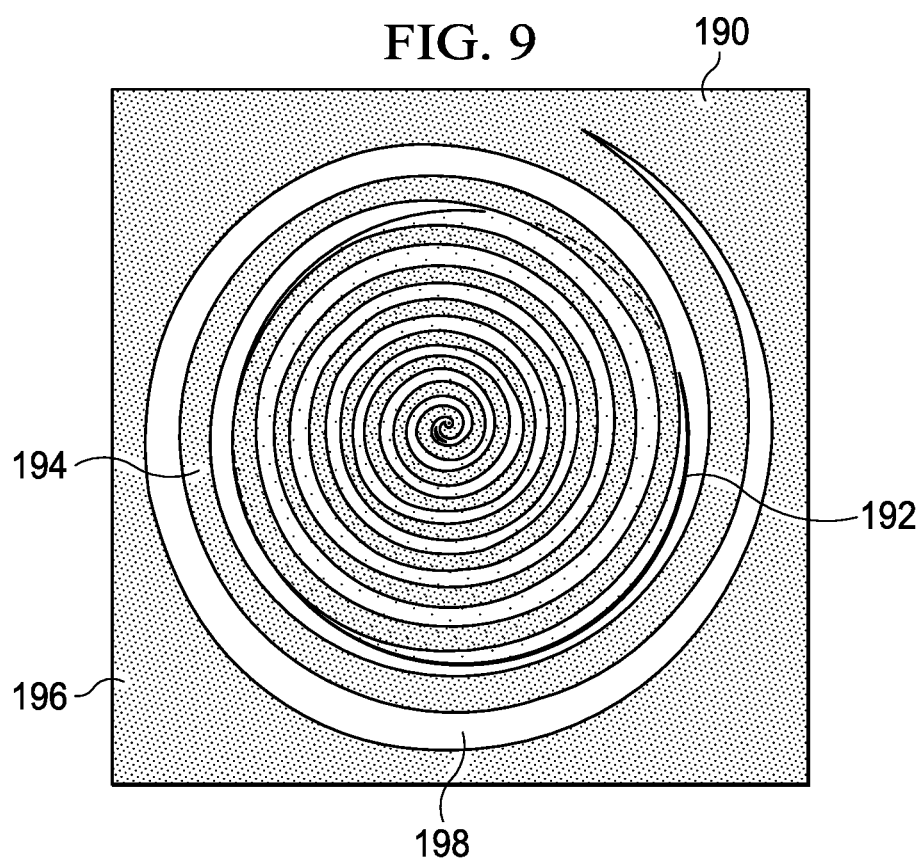

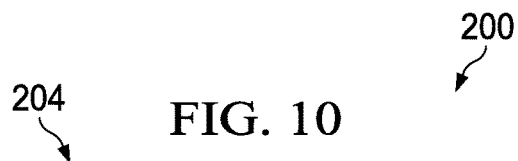
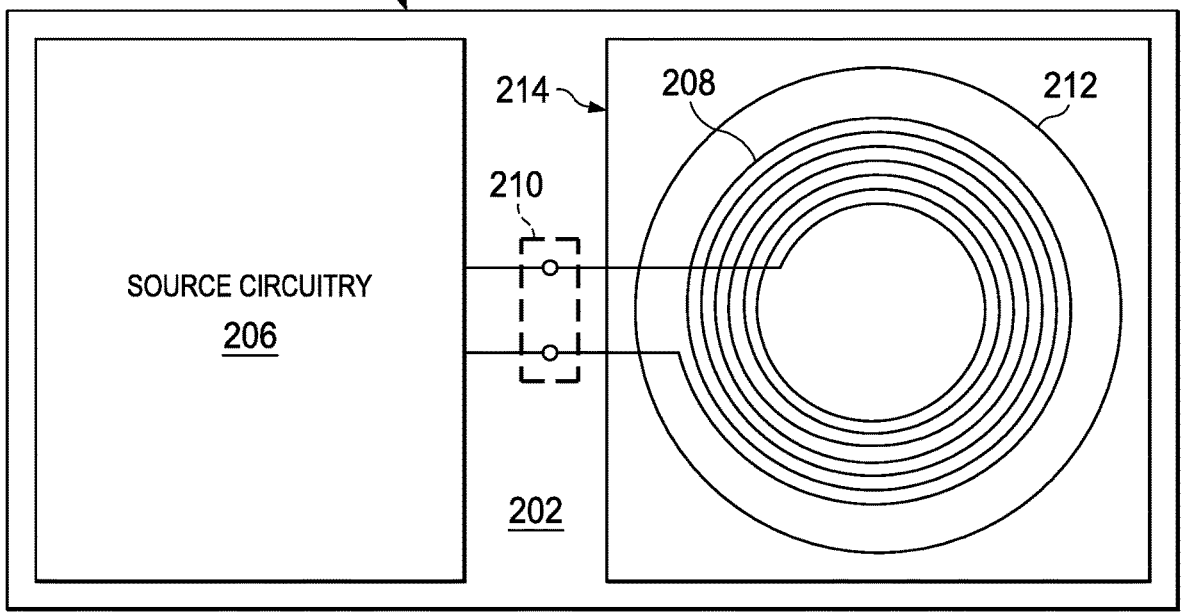
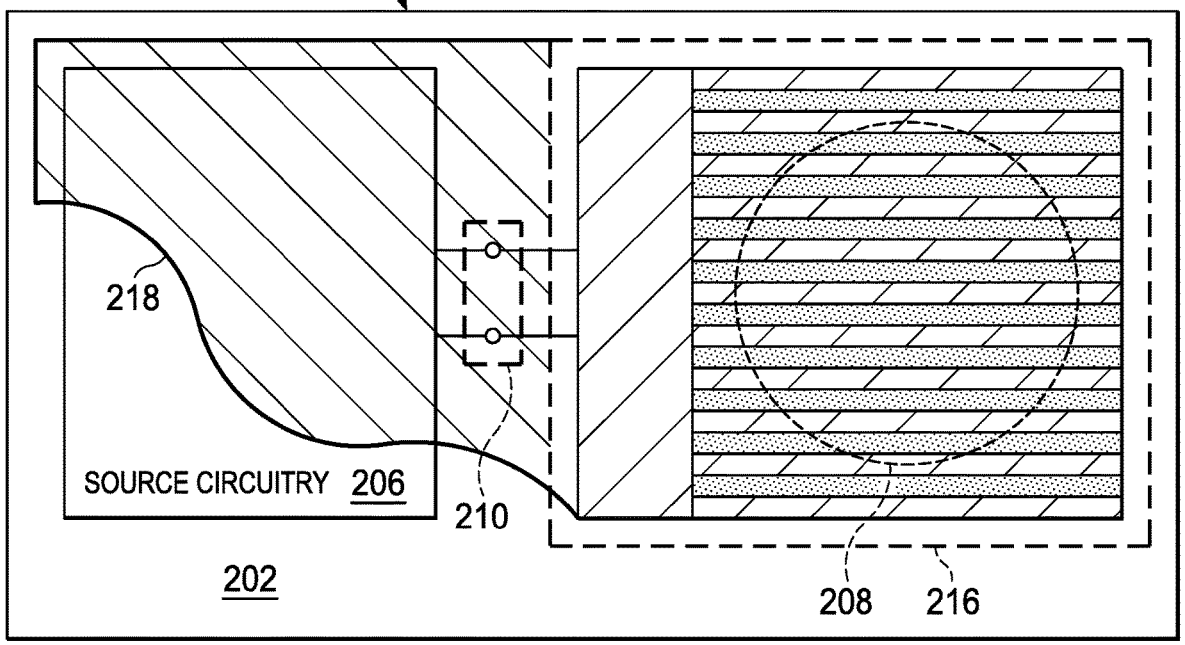

WIRELESS POWER TRANSMITTER WITH SHIELDING STRUCTURE

CROSS-REFERENCE TO RELATED APPLICATION

Under 35 U.S.C. §§ 119(e), 120, this continuation claims benefits of priority to U.S. Nonprovisional patent application Ser. No. 14/980,212, filed on Dec. 28, 2015, which is a continuation of U.S. Nonprovisional patent application Ser. No. 13/654,692, filed on Oct. 18, 2012, which claims the benefit of U.S. Provisional Patent Application No. 61/587,504 filed on Jan. 17, 2012. The entirety of the above referenced applications are hereby incorporated by reference herein.

TECHNICAL FIELD

This disclosure relates to a wireless power transmitter. More particularly, this disclosure relates to a wireless power transmitter that includes a shield.

BACKGROUND

Wireless energy transfer or wireless power is the transmission of electrical energy from a power source to an electrical load without interconnecting physical conductors. In some examples, wireless power can be supplied by employment of a transformer.

A transformer is a device that transfers electrical energy from one circuit to another through inductively coupled conductors, the transformer's coils (e.g., windings). A varying current in a primary winding creates a varying magnetic flux, and thus induces a varying magnetic field through a secondary winding. The varying magnetic field induces a varying electromotive force (EMF), or "voltage", in the secondary winding. This effect can be referred to as inductive coupling.

BRIEF DESCRIPTION OF THE DRAWINGS

FIG. 9 illustrates still another example of a shield overlying a transmitting coil for a wireless power transmitter.

FIG. 10 illustrates an example of a transmitter for a wireless power transfer system.

FIG. 11 illustrates an example of the transmitter illustrated in FIG. 9 with a first, second and fifth shield mounted thereon.

SUMMARY

Figure 1:
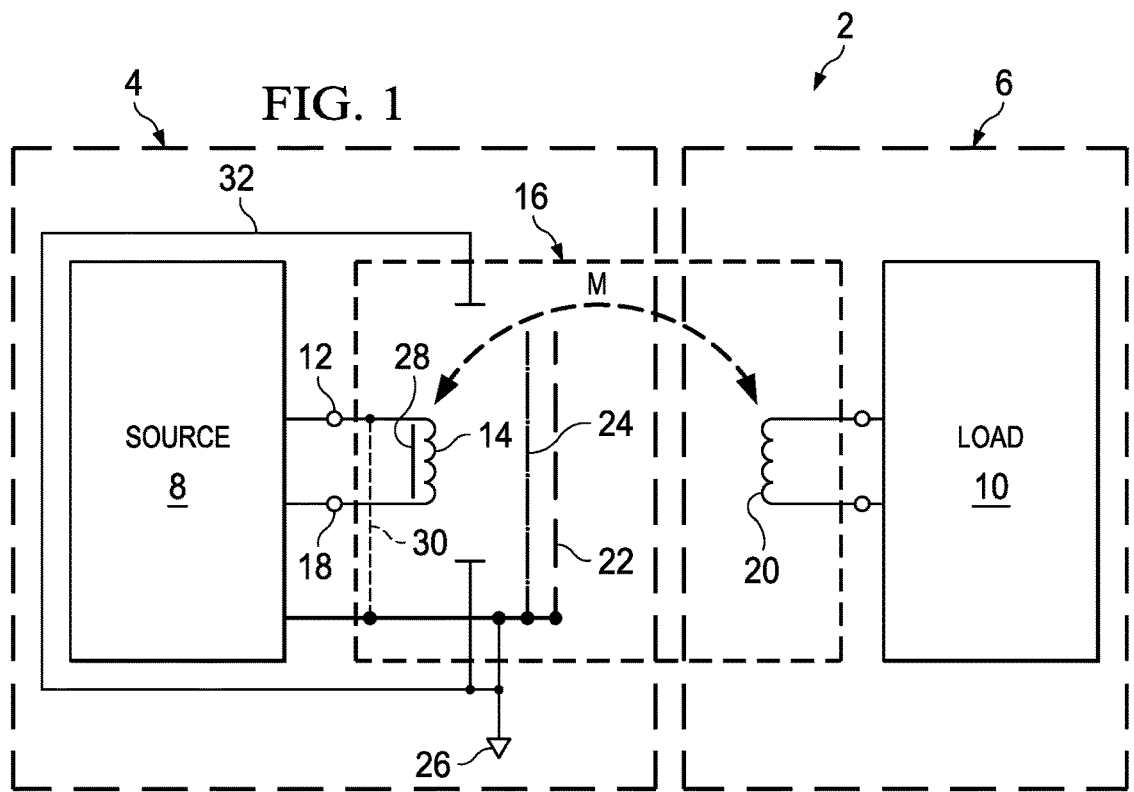
FIG. 1 illustrates an example of a wireless power transfer system.

In one example, a wireless power transmitter can include a transmitting coil configured to wirelessly transmit power to a receiving coil. The wireless power transmitter can also include a shield residing on a given side of a substrate spaced apart from the transmitting coil. The shield can be configured to filter an electric field induced by the transmitting coil. The shield can include a trace forming a planar pattern of a conductive material that extends across a perimeter of a footprint of the transmitting coil. The trace has a first end coupled to a base region of the shield and extends from the base region to terminate in a second end that is distal from the base region of the shield.

In another example, a wireless power transfer system can include a transmitter comprising a source comprising circuitry mounted on a printed circuit board. The wireless power transfer system can also include a transmitting coil configured to wirelessly transfer electrical power from the transmitting coil to a receiving coil. The transmitting coil and the receiving coil can be spaced apart. The wireless power transfer system can further include a shield spaced apart from and positioned between the transmitting coil and the receiving coil. The shield can be configured to filter an electric field induced by the transmitting coil. The shield can have a trace of conductive material forming a planar pattern. The trace can have first end that is coupled to a base region of the shield and that extends from the base region to terminate in a second end that is distal from the base region of the shield.

In yet another example, a wireless power transfer system can include a transmitting coil coupled to circuitry. The wireless power transfer system can also include a receiving coil spaced apart from the transmitting coil. The transmitting coil can be configured to wirelessly induce a current on the receiving coil. The wireless power transfer system can further include a substrate formed of an insulating material. The substrate can be spaced apart from and positioned between the transmitting coil and the receiving coil. The substrate can include a first shield residing on a given side of the substrate and a second shield residing on another side of the substrate. The other side of the substrate can oppose the given side of the substrate. The first shield and the second shield can each have a trace of conductive material with a first end that is coupled to a base region and that extends from the base region to terminate in a second end that is distal form the base region of the shield. The trace of the first shield and the second shield can form an interleaving pattern, and a projection of the interleaving pattern can substantially covers a footprint of the transmitting coil.

DETAILED DESCRIPTION

This disclosure includes shields for a wireless power transfer system (WPTS). First and second shields can be positioned in between a transmitting coil and a receiving coil of the wireless power transfer system. The first and second shield can each include a conductive trace that extends away from a base region of the respective first and second shields. The first and second shields can filter (e.g., attenuate and/or eliminate) an electric field induced by the transmitting coil while only attenuating a corresponding magnetic field induced by the transmitting coil by 2% or less. Moreover, additional shields, such as a third shield of ferrite material underlying the transmitting coil, a fourth shield including a plate, screen or film underlying the third shield and/or a fifth shield including a housing of conductive material can further filter (e.g., attenuate and/or eliminate) the electric field induced by the transmitting coil. Reducing and/or eliminating the electric field induced by the transmitting coil can reduce electromagnetic interference (EMI) caused by the transmitting coil. The approach disclosed herein is particularly useful in reducing WPTS emissions (e.g., in the AM radio band) for use in electronics used within vehicles.

FIG. 1 illustrates a block diagram of an example of a wireless power transfer system 2. The system 2 can include a transmitter 4 that can wirelessly provide power to a receiver 6. As used herein, term "wirelessly" in the context of providing power denotes transfer of energy between a source 8 of electrical power and a load 10 without physical connectors, such as across an air gap or other non-conductive medium. For instance, the electrical energy can be wirelessly transferred between the source and load in the absence of conductors and/or a common solid core of a transformer. The transmitter 4 can include the source 8 and the receiver 6 can include the load 10. The source 8 can be implemented, for example, a power source and/or circuitry that can provide an alternating current (AC) signal to an output port 12. In some examples, the power source can derive power from an electrical outlet, such as a cigarette lighter receptacle that can, for example, provide a 12V direct current (DC) signal. In such a situation, the source 8 can include a power inverter that can convert the 12V DC signal into an AC signal. In other examples, the source 8 can derive power from a standard 110V or 220V electrical outlet.

As a further example, the output port 12 of the source 8 can be coupled to a transmitting coil 14. The transmitting coil 14 can be implemented, for example, as a primary winding of a transformer 16. The transmitting coil 14 can also be coupled to a return port 18 of the source 8. The transmitting coil 14 can be tightly coupled with a receiving coil 20 of the receiver 6. The receiving coil 20 can be implemented, for example, as a secondary winding of the transformer 16. The AC signal on the transmitting coil 14 can induce an AC signal on the receiving coil 20 via mutual inductance, as indicated by "M" in FIG. 1. In some examples, the transmitter 4 and the receiver 6 can be in physical contact with each other but the transmitting coil 14 and the receiving coil 20 can remain electrically isolated from each other. The transmitting coil 14 and the receiving coil 20 can be separated by a distance from about 0.1 millimeters (mm) up to about 10 millimeters (mm). Moreover, the transmitting coil 14 and the receiving coil 20 do not share a common solid core, such that the receiving coil 20 and the transmitting coil 14 can be easily moved relative to each other.

The mutual inductance, M, between the transmission coil 14 and the receiving coil 20 can vary based on the physical properties of the transformer 16. The mutual inductance M, can be measured in henries (H). Moreover, the coupling coefficient, k of the transformer 16 can indicate an efficiency of power transfer between the transmitting coil 14 and the receiving coil 20. The coupling coefficient, k of the transformer 16 can be calculated by Equation 1:

$$k = \frac{M}{\sqrt{L_1 L_2}} \quad \text{Equation 1}$$

wherein:
k is the coupling coefficient and $0 \leq k \leq 1$;
M is the mutual inductance, measured in henries (H) between the transmitting coil 14 and the receiving coil 20;
$L_1$ is the inductance, measured in henries (H) of the transmitting coil 14; and
$L_2$ is the inductance, measured in henries (H) of the receiving coil 20.

In some wireless transfer power systems, about 80% of magnetic flux generated from a magnetic field induce by the transmitting coil 14 is transferred to the receiving coil 20. Thus, in such a wireless power transfer system, up to about 20% of the electromagnetic field generated at the transmitting coil 14 can potentially be coupled to other electrical circuits or metals that are within a relatively close proximity of the transformer 16. Accordingly, the transmitter 4 can include shields in a manner explained herein that can filter (e.g., attenuate and/or eliminate) the electric field that permeates away from the receiving coil 20.

In some examples, the load 10 of the receiver 6 can be implemented, for example, as a battery driven device, such as a mobile phone, a laptop computer, a smartphone, a personal digital assistant (PDA), a tablet computer or the like. In this manner, the magnetic field induced on the receiving coil 20 can induce an AC signal on the load 10 of the receiver 6. Accordingly, in some examples, the AC signal induced by the receiving coil 20 can charge a battery associated with the receiver 6. Additionally or alternatively, the AC signal induced by the receiving coil 20 can be employed as a power source for the load 10 of the receiver 6.

A first shield 22 can be a first layer of a conductive material spaced relatively close to the transmitting coil 14 (e.g., about 1-3 mm). Moreover, the first shield 22 can be positioned on a given side of the transmitting coil 14. Additionally, the first shield 22 can be positioned between the transmitting coil 14 and the receiving coil 20 of the transformer 16. In some examples, the first shield 22 can include a substantially planar conductive trace that can have a pattern. In some examples, the pattern of the trace can be configured as a comb shape. In such comb shape, the trace can include an elongated base region having a side edge from which plurality of trace elements extend outwardly in a substantially parallel arrangement, that is transverse to a longitudinal axis of the base, and terminate at respective distal ends thereof. In other examples, the pattern can be different shapes, such as a spiral. The conductive trace of the first shield 22 can be formed from an electrically conductive material, such as copper or aluminum. The first shield 22 can reside on a given layer of a substrate. The substrate can be form of a sheet of insulating material. The first shield 22 can be formed such that no closed loop paths exist on the conductive trace of the first shield 22, thereby reducing and/or eliminating Eddy currents that could otherwise be induced by an electric field induced by the transmitting coil 14.

In some examples, a second shield 24 can also be included on the transmitter 4. The second shield 24 can have a conductive trace with a pattern of a similar shape and sizes as the pattern of the conductive trace of the first shield 22. Moreover, in some examples, the second shield 24 can be adhered to another side of the substrate, wherein the other side of the substrate opposes the given side of the substrate. The second shield 24 can be offset from the first shield 22 such that the conductive traces of the first shield 22 and the second shield 24 are arranged in an interleaving pattern that can have a projection that can extend over substantially all of a footprint (e.g., a planar projection of a side or face) of the transmitting coil 14. The first shield 22 and the second shield 24 can be connected to an electrically neutral point 26 (e.g., electrical ground or chassis ground).

Additionally, in some examples, a third shield 28 can be included on the transmitter 4. The third shield 28 can be implemented as a disc (or other shape) underlying the transmitting coil 14 between the transmitting coil 14 and a fourth shield 30. The third shield 28 can be formed for ferrite or another soft ferromagnetic material that has a magnetic permeability greater than one. Moreover, the third shield 28 of the transmitting coil 14 can also have a high specific (e.g., electrical) resistance. In some examples, the third shield 28 can have a circular shape. The third shield 28 can facilitate confinement of a magnetic field induced from a return side of the transmitting coil 14. Further, the third shield 28 can allow the transmitting coil 14 to be positioned on or near a metal surface and/or upon electronics employed in the transmitter 4.

Still further, in some examples, the fourth shield 30 can be included on the transmitter 4. The fourth shield 30 can be implemented as a metal plate, film or a screen. The fourth shield 30 can be positioned on another side of the transmitting coil 14, wherein the other side of the transmitting coil 14 opposes the given side of the transmitting coil 14. That is, the fourth shield 30 can be positioned between the transmitting coil 14 and the source 8. The fourth shield 30 can be formed from a material with a high conductivity, such as copper, aluminum or gold. The fourth shield 30 can be connected to the electrically neutral point (e.g., electrical ground or chassis ground) 26. The fourth shield 30 can be as large as or larger than the third shield 28.

Yet further, in some examples, a fifth shield 32 can be included on the transmitter 4. The fifth shield 32 can house the transmitter 4 and provide an opening to expose the footprint of the transmitting coil 14 to the receiving coil 20. In such a situation, the fifth shield 32 can wrap around all or part of the transmitter 4, while leaving the opening for the transmitting coil 14. The fifth shield 32 can be formed from a material with a high conductance, such as copper or aluminum. Additionally or alternatively, the fifth shield 32 can have a high magnetic permeability. In some examples, the fifth shield 32 can be formed from layered material, where each layer has different properties. For instance, in some examples, the fifth shield 32 can be formed from copper or tin-plated steel. The fifth shield 32 can be coupled to the electrically neutral point (e.g., electrical ground 26).

By employment of the first through fifth shields 22, 24, 28, 30 and 32, a reduction of EMI can be achieved while maintaining nearly the same (e.g., within 2%) efficiency of power transfer between the transmitting coil 14 and the receiving coil 20. The EMI can be reduced without significantly affecting the efficiency of the power transfer, since the first, second, third, fourth and fifth shields 22, 24, 28, 30 and 32 do not significantly attenuate the magnetic field induced by the transmitting coil 14. Instead, the first, second, third, fourth and fifth shields 22, 24, 28, 30 and 32 can concentrate the magnetic field in a direction of the receiving coil 20, while attenuating and/or eliminating the electric field induced by the transmitting coil 14. It is noted that in some examples, a subset of the first, second, third, fourth and fifth shields 22, 24, 28, 30 and 32 can be employed. Moreover, in such a situation, the subset of the shields can be any combination of the first through fifth shields 22, 24, 28, 30 and 32.

Figure 2:
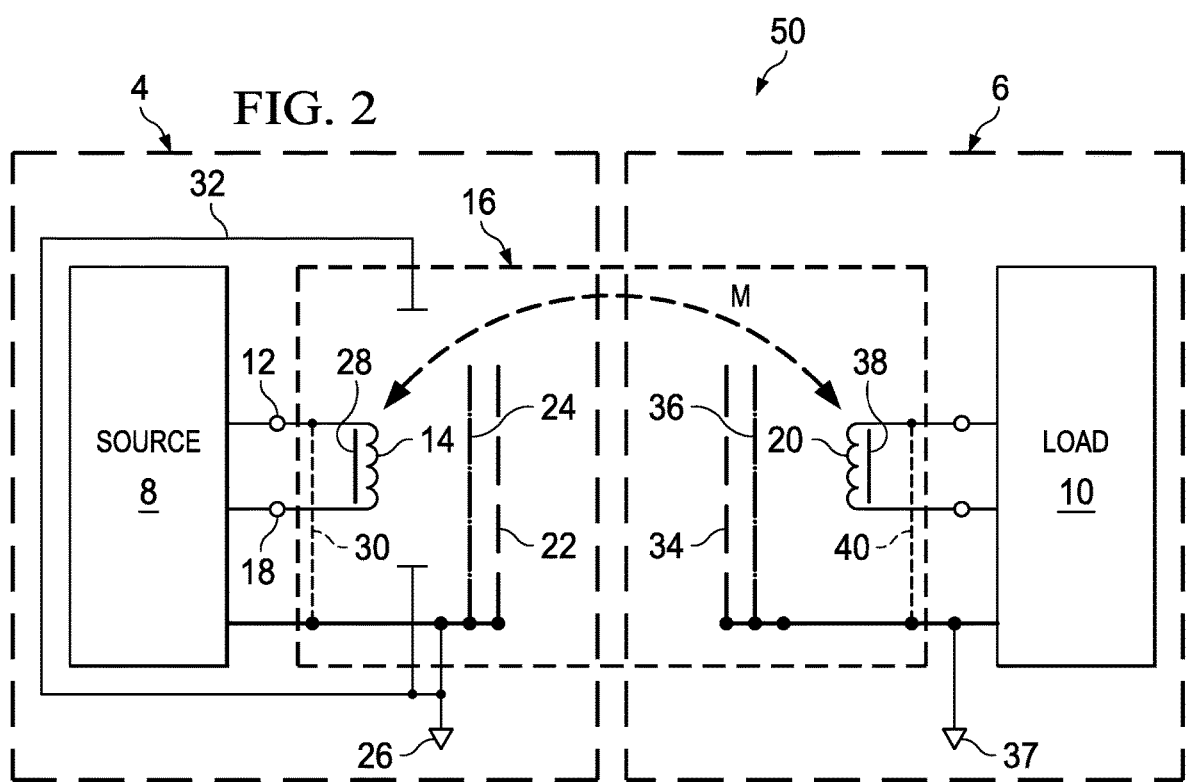
FIG. 2 illustrates another example of a wireless power transfer system.

FIG. 2 illustrates an example of a wireless transfer power system 50 similar to the wireless power transfer system 2 illustrated in FIG. 1. For purposes of simplification of explanation, the same reference numbers are used in FIGS. 1 and 2 to denote the same structure. In the wireless power transfer system 50, shields can be added to the receiver 6 to further filter (e.g., reduce and/or eliminate) EMI. For instance, in some examples, the receiver 6 can include a sixth shield 34 and a seventh shield 36 that could be employed in a manner similar to the first and second shields 22 and 24, respectively of the transmitter 4. In such a situation, the sixth and seventh shields 34 and 36 can be coupled to an electrically neutral point 37. The electrically neutral point 37 (e.g., ground or chassis ground) can be a different electrically neutral point than the electrically neutral point 26. Similarly, the receiver 6 can include an eighth shield 38 that can be implemented as a disc (or other shape) underlying the receiving coil 20 and positioned between the receiving coil 20 and a ninth shield 40. The eighth shield 38 and the ninth shield 40 can be implemented in a manner similar to the third shield 28 and the fourth shield 30, respectively of the transmitter 4. Moreover, the eighth and ninth shields 38 and 40 can be coupled to the electrically neutral point 37. Inclusion of the sixth through ninth shields 34, 36, 38 and 40 can further attenuate and/or eliminate the electric field induced by the transmitting coil 14 while still not significantly attenuating the magnetic field induced by the transmitting coil 14. Further, the sixth through ninth shields 34, 36, 38 and 40 can be employed in environments where the load 10 is particularly sensitive to EMI, such as situations where the load 10 includes a touchscreen with a scan frequency that coincides with operating frequency harmonics of the transmitting coil 14 and/or the receiving coil 20.

Figure 3:
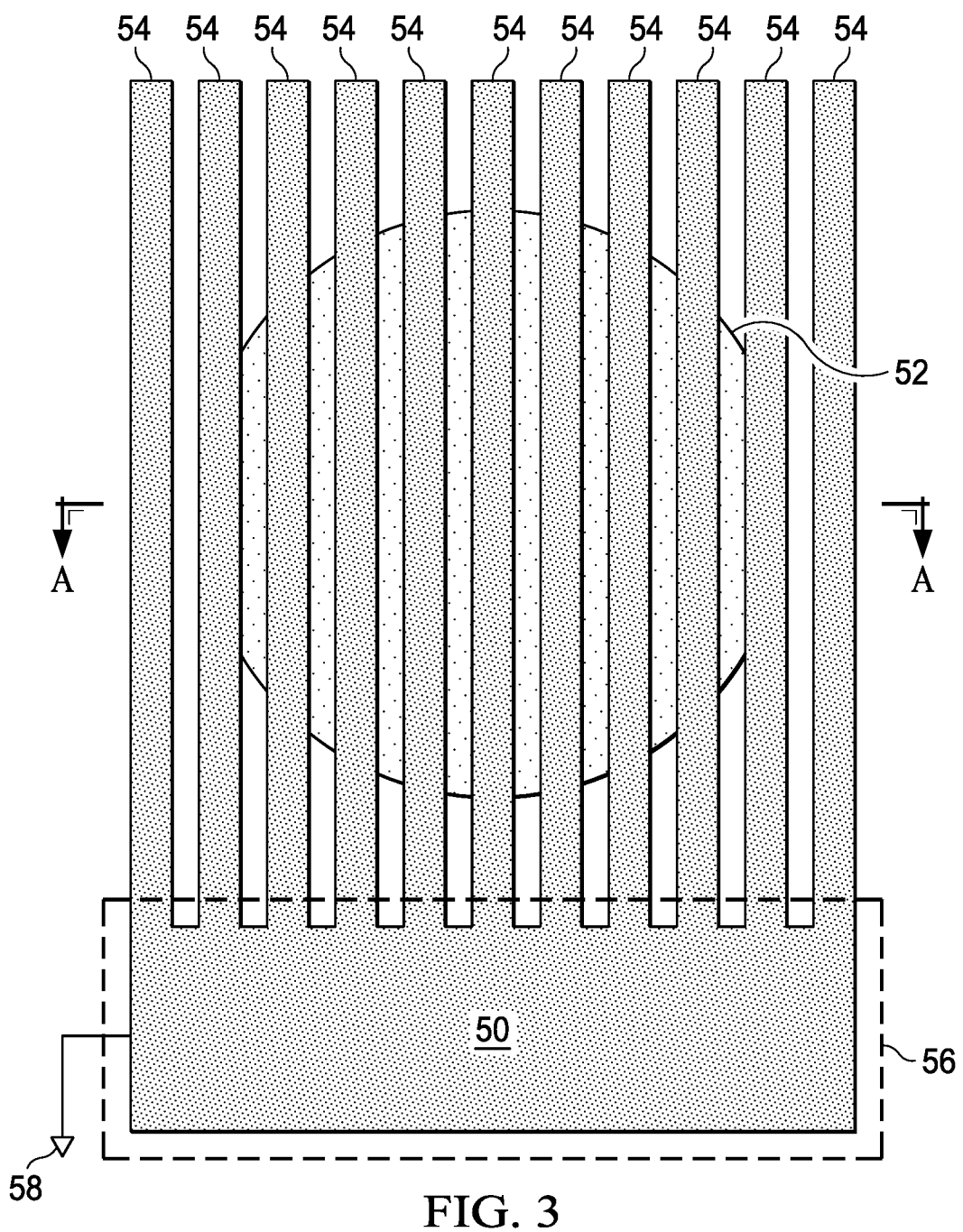
FIG. 3 illustrates an example of a shield overlying a transmitting coil transmitter for a wireless power transmitter.
Figure 4:
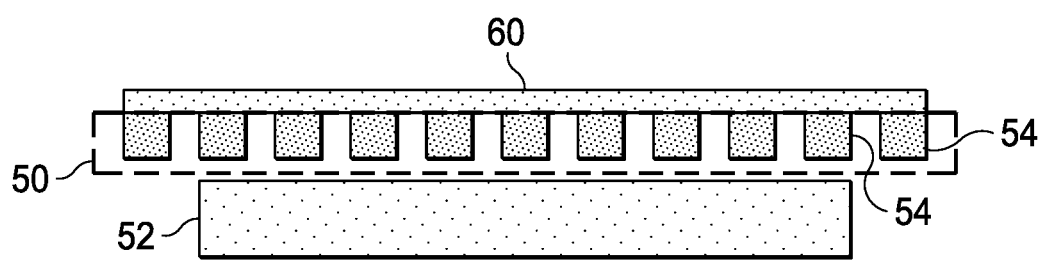
FIG. 4 illustrates a cross sectional view of the shield and the transmitting coil taken along line A-A in FIG. 2.

FIG. 3 illustrates a plan view of an example of a shield 50 (e.g., the first shield 22 illustrated in FIG. 1 or the sixth shield 34 illustrated in FIG. 2) overlaying a transmitting (or receiving) coil 52 (e.g., the transmitting coil 14 illustrated in FIG. 1 or the receiving coil 20 illustrated in FIG. 2) that could be implemented on a transmitter of wireless power transfer system. FIG. 4 illustrates a cross sectional view of the shield 50 and transmitting coil taken along line A-A. For purposes of simplification of explanation, the same reference numbers are employed in FIGS. 3 and 4 to denote the same structure. The shield 50 can have a plurality of traces 54 forming a planar pattern. In the example of FIG. 4, the traces 54 can extend outwardly from a base region 56 to terminate in an end that is spaced apart from the base region by a longitudinally extending projection of the traces. Each of the traces can have a generally rectangular configuration between the base region and the terminal end thereof. The base region 56 can also have a rectangular shape. The pattern thus can form a comb shape where the traces 54 can corresond to elongated parallel teeth of the comb. By forming the pattern of the traces to have a comb shape, no closed loop electrical paths are created.

The traces 54 and the base region 56 of the shield 50 can be formed from a material with a relatively high conductivity, such as copper or aluminum. Moreover, the shield 50 can be coupled to an electrically neutral point 58, such as electrical ground or chassis ground. The shield 50 can be formed on a substrate 60 of insulating material, such as a printed circuit board. The shield 50 can be spaced apart from the transmitting coil, such as a distance of up to 3 mm.

Although the transmitting coil is illustrated as being circular, the transmitting coil can be of any shape, including round, square, elliptical, rhombic or free form. As illustrated in FIG. 3, the transmitting coil 52 can be positioned such that an entire footprint of the transmitting coil 52 is positioned in an underlying relationship within a perimeter of the shield 50 when viewed from the plan view, such as the view illustrated in FIG. 3. In this manner, the shield 50 can extend across the perimeter of the footprint of the transmitting coil 52. Employment of the shield 50 can reduce and/or eliminate EMI by filtering (e.g., blocking and/or attenuating) an electric field induced by the transmitting coil 52, while allowing a magnetic field induced by the transmitting coil 52 to transmit through the shield 50 with minimal attenuation (e.g., about 2% or less).

Figure 5:
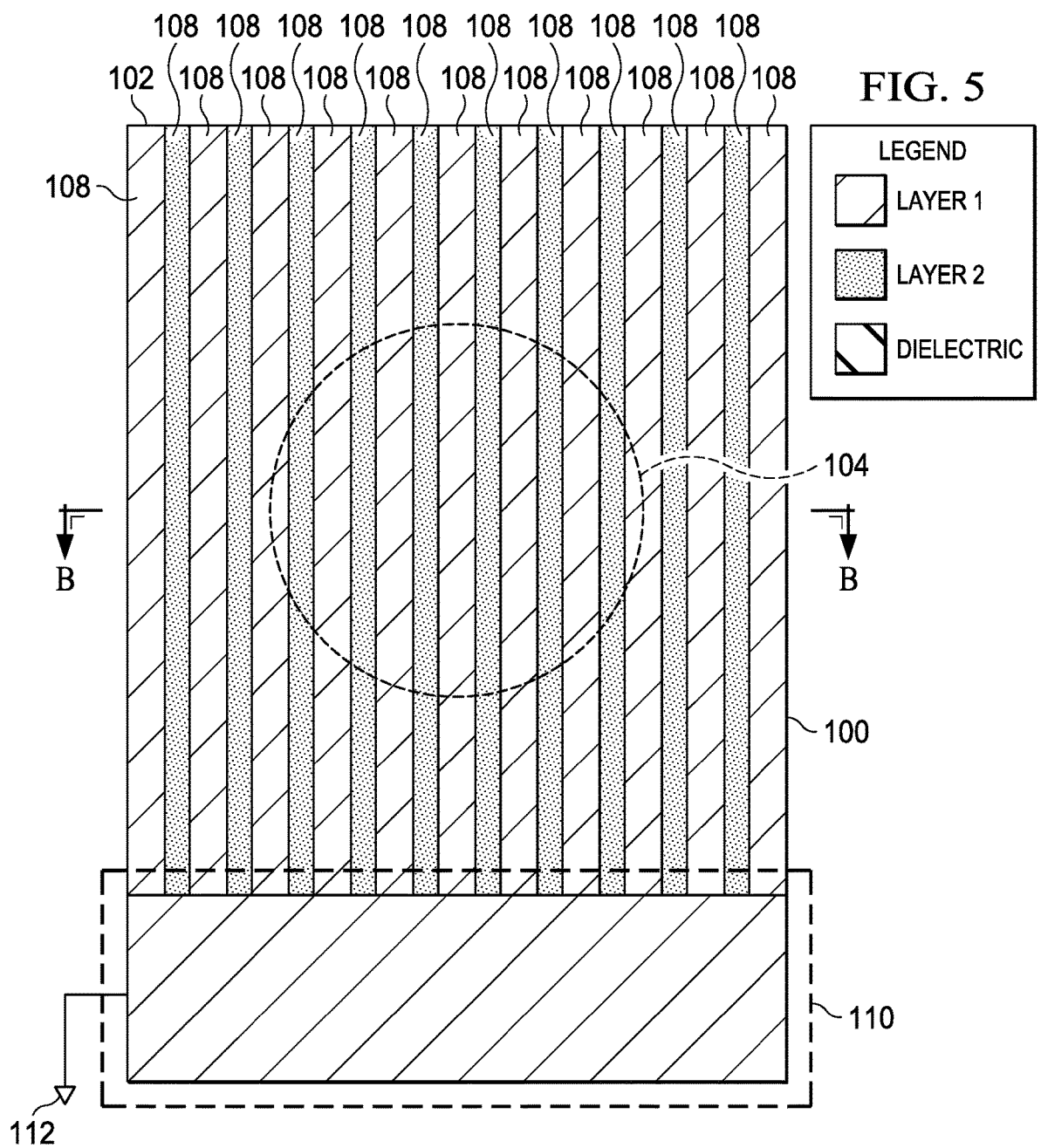
FIG. 5 illustrates an example of a first and second shield overlying a transmitting coil for a wireless power transmitter.
Figure 6:
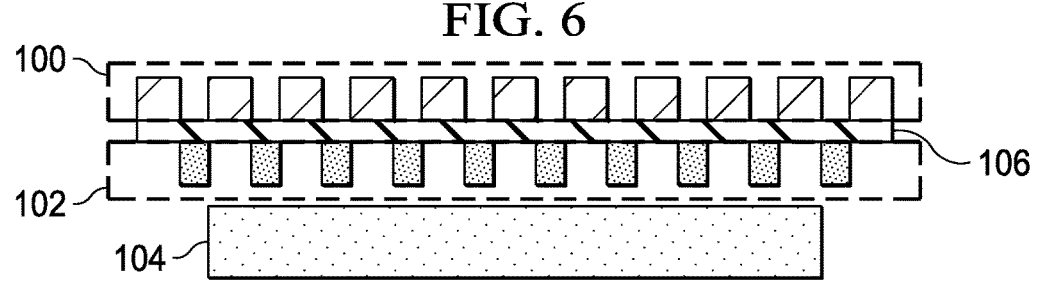
FIG. 6 illustrates a cross sectional view of the first and second shield and the transmitting coil taken along line B-B in FIG. 4.

FIG. 5 illustrates a plan view of an example of a shield structure that includes a first shield 100 and a second shield 102 (e.g., the first and second shields 22 and 24 illustrated in FIG. 1 or the sixth and seventh shields 34 and 36 illustrated in FIG. 2) that overlay a transmitting (or receiving) coil 104 (e.g., the transmitting coil 14 illustrated in FIG. 1 or the receiving coil 20 illustrated in FIG. 2) that could be implemented on a transmitter of a wireless power transfer system. The first shield 100 and the second shield 102 can be spaced apart from the transmitting coil by a distance of 0 mm to about 3 mm. FIG. 6 illustrates a cross sectional view of the first and second shields 100 and 102 and the transmitting coil 104 taken along line B-B. The first and second shields 100 and 102 can be formed on opposing sides of a substrate 106. The substrate 106 can be formed from an electrically insulating material, such as a printed circuit board. For purposes of simplification of explanation, in FIG. 5 the substrate 106 is illustrated as being transparent, so that features of both the first and second shields 100 and 102 can be observed. However, it is to be understood that in some examples, the substrate 106 can be translucent and/or opaque.

The first shield 100 can be spaced away from the transmitting coil 104 by a distance of up to about 3 mm. Moreover, the first shield 100 can be distal to the transmitting coil 104 relative to the second shield. The first shield 100 and the second shield 102 can have a similar shape. Moreover, in some examples, both the first and second shields 100 and 102 can have traces 108 (e.g., conductive traces) that form a comb shape with a base region 110 and the substantially parallel and coplanar traces 108 extending away from the base region 110 to terminate in a distal end thereof. The traces 108 of the first and second shields 100 and 102 can be formed such that neither the first shield 100 nor the second shield 102 creates a closed electrical loop. The first and second shields 100 and 102 can be coupled to an electrically neutral point 112 (e.g., electrical ground or chassis ground).

Additionally, the first shield 100 and the second shield 102 can be positioned and/or configured such that the traces 108 of the first shield 100 and the traces 108 of the second shield 102 form an interleaving pattern. For example, traces of the first shield 100 can align with respective spaces between traces of the second shield 102 and the traces 108 of the second shield 102 can align with spaces between the traces 108 of the first shield 100. The width of the traces 108 and the spaces between traces in each shield 100 and 102 can be substantially equal. For example, the first shield 100 and the second shield 102 can have similar configurations each attached to the dielectric insulating layer with and configured with an offset equal to the trace width to provide the interleaving of traces as shown in FIG. 6. In such a situation, an entire footprint of the transmitting coil 104 can reside between edges of the interleaving traces, as indicated by the dashed line representing the transmitting coil 104 in FIG. 5. Thus, the footprint of the transmitting coil 104 can be substantially blocked in the plan view by the interleaving pattern formed by the first shield 100 and the second shield 102. Moreover, a projection of the interleaving pattern formed by the first shield 100 and the second shield 102 can substantially cover the entire footprint of the transmitting coil 104. Employment of the first and second shields 100 and 102 can reduce and/or eliminate EMI (particularly in the AM radio band) by filtering (e.g., blocking and/or attenuating) an electric field induced by the transmitting coil 104, while allowing a magnetic field induced by the transmitting coil 104 to transmit through the first and second shields 100 and 102 with minimal attenuation (e.g., about 2% or less).

Figure 7:
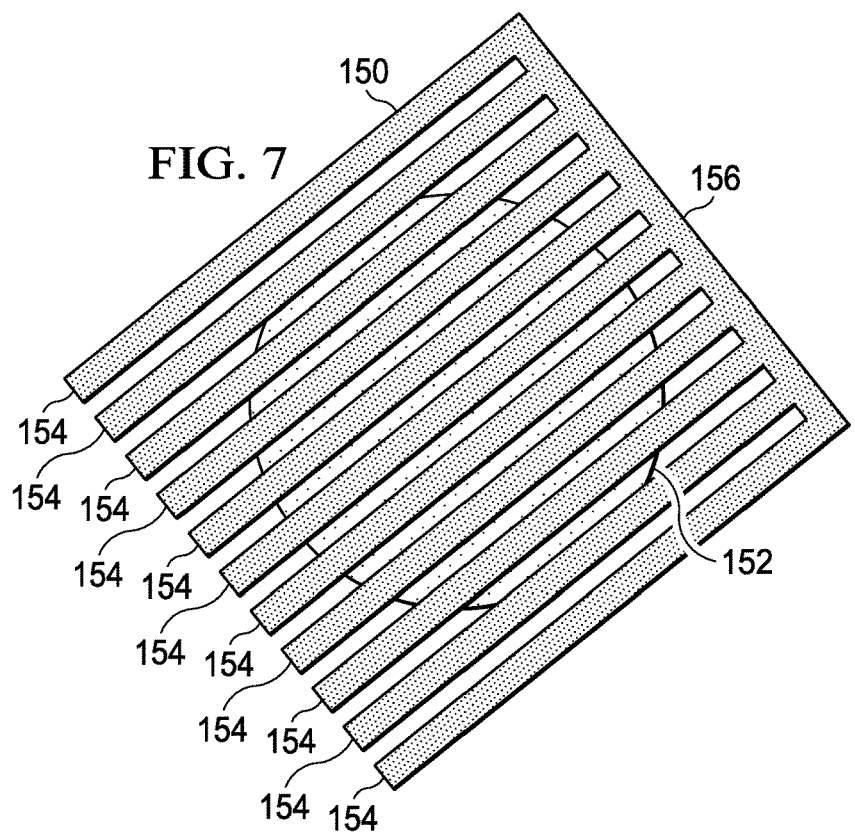
FIG. 7 illustrates another example of a shield overlying a transmitting coil for a wireless power transmitter.

FIG. 7 illustrates another example of a shield 150 (e.g., the first shield 22 illustrated in FIG. 1 or the sixth shield 34 illustrated in FIG. 2) that overlays a transmitting (or receiving) coil 152 (e.g., the transmitting coil 14 illustrated in FIG. 1 or the receiving coil 20 illustrated in FIG. 2) that could be implemented on a transmitter of a wireless power transfer system. The shield 150 can have traces 154 (e.g., conductive traces) forming a planar pattern. The pattern can have a comb shape. As disclosed herein, the traces 154 (e.g., fingers) can extend outwardly from a common linear side edge of a base region 156 such that each adjacent pair of fingers are spaced apart from each other by longitudinally extending spaces. Further, similar to the shield 50 illustrated in FIG. 3, none of the traces 154 of the shield 150 form a closed electrical loop. It is noted that in some examples, the base region 156 can have less surface area than the base region 156 illustrated in FIG. 3. The shield 150 can be formed of a conductive material, such as copper or aluminum and can be disposed on a substrate (e.g., a sheet) of insulating material, such as a printed circuit board. For purposes of simplification of explanation, the substrate in FIG. 6 is removed from view.

Figure 8:
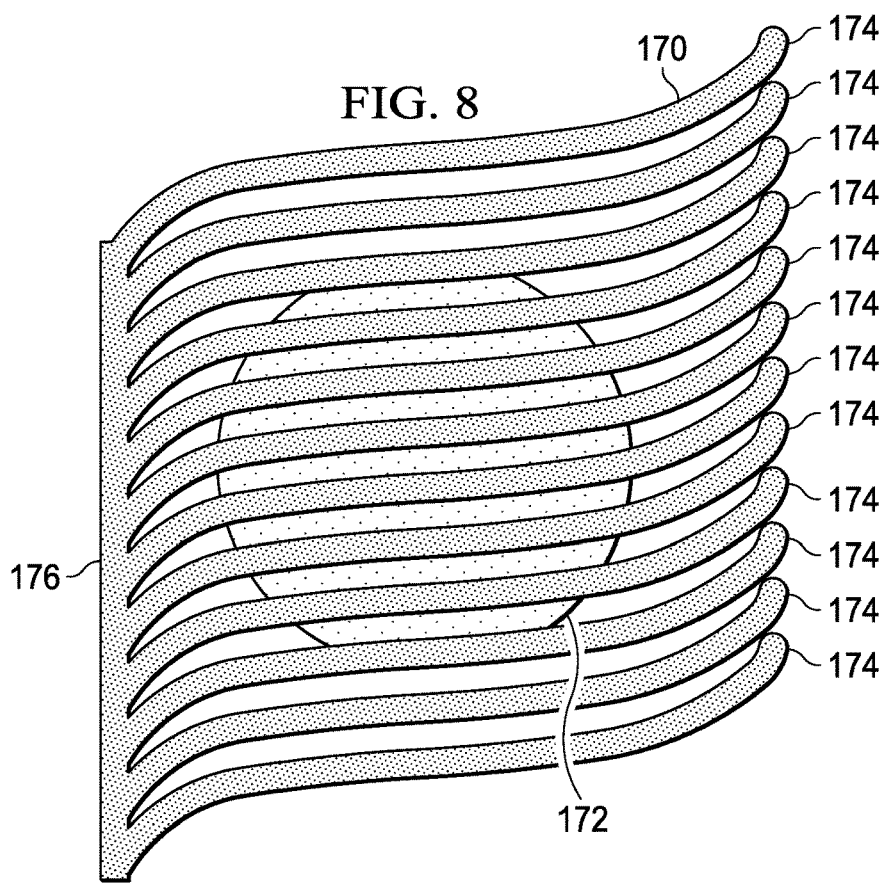
FIG. 8 illustrates yet another example of a shield overlying a transmitting coil for a wireless power transmitter.

FIG. 8 illustrates another example of a shield 170 (e.g., the first shield 22 illustrated in FIG. 1 or the sixth shield 34 illustrated in FIG. 2) that overlays a transmitting (or receiving) coil 172 (e.g., the transmitting coil 14 illustrated in FIG. 1 or the receiving coil 20 illustrated in FIG. 2) that could be implemented on a transmitter of a wireless power transfer system. The shield 170 can have traces 174 (e.g., conductive traces) that form a planar pattern, and the pattern can form a comb shape. For example, the comb-shaped shield can include traces 174 that extend from a common edge of a base region 176. It is noted that in some examples, the base region 176 can have less surface then the base region 56 illustrated in FIG. 3. Moreover, the traces 174 can each be curved instead of linear, as illustrated in FIG. 8. In some examples, the traces 174 can be co-planar and the direction of curvature can be transverse to the base region 176. In other examples, the direction of curvature for the traces can be configured to extend out a given plane in which the base region resides (e.g., varying in distance toward and/or away from the coil 172). Further, similar to the shield 50 illustrated in FIG. 3, none of the traces 174 of the shield 170 form a closed electrical loop. The traces 174 of the shield 170 can be formed of a conductive material, such as copper or aluminum and can be formed on a substrate of insulating material, such as a printed circuit board. For purposes of simplification of explanation, the substrate in FIG. 8 is removed from view.

FIG. 9 illustrates another example of a shield 190 (e.g., the first shield 22 or the sixth shield 34 illustrated in FIG. 1) that overlays a transmitting (or receiving) coil 192 (e.g., the transmitting coil 14 illustrated in FIG. 1 or the receiving coil 20 illustrated in FIG. 2) that could be implemented on a transmitter of a wireless power transfer system. The shield 190 can have a trace 194 (e.g., a conductive trace) that forms a planar pattern having a spiral shape. Moreover, in such a situation, the trace 194 can extend from a base region 196, corresponding to a radially outer extent of the spiral, with a continuously decreasing radius to form a spiral pattern with a gap 198 formed between the decreasing radius of the trace 194. In such a situation, the base region 196 can be formed along a perimeter of the shield 190. Further, similar to the shield illustrated in FIG. 9, the trace does not form a closed electrical loop. The trace 192 of the shield 190 and the base region 196 of the shield 190 can be formed of a conductive material, such as copper or aluminum and can be formed on a substrate. For purposes of simplification of explanation, the substrate in FIG. 8 is removed from view.

Each of the shields 150, 170 and 190 illustrated in FIGS. 7-9 can be matched with another shield (e.g., the second shield 24 illustrated in FIG. 1) with a similar pattern to form an interleaving pattern, such as shown and described with respect to FIGS. 5 and 6. In such examples, a first shield (shields 150, 170 and 190) illustrated in FIGS. 7-9) can be formed on a given side of a substrate, while a second shield can be formed on another side of the substrate that opposes the given side of the substrate. In such a situation, the second shield can be arranged to be offset from the first shield to form the interleaving pattern, such as disclosed herein. The interleaving pattern can substantially overlay an entire footprint of a transmitting coil, such that a projection of the interleaving pattern can cover the entire footprint of the transmitting coil. For instance, in the example of the shield 190 illustrated in FIG. 9, the other shield could be formed with a similar spiral pattern where a trace extends with a continuously decreasing radius to form a spiral pattern such that a projection of the trace covers the gap 198 formed the trace 194 of the shield 190 in a plan view.

FIG. 10 illustrates an example of a transmitter 200, such as the transmitter 4 illustrated in FIG. 1 for a wireless power transfer system. The transmitter 200 can include a source 202, such as the source 8 illustrated in FIG. 1. The source 202 can be implemented, for example, as a printed circuit board 204 that includes source circuitry 206 and/or connectors to induce a current on a transmitting coil 208 (e.g., the transmitting coil 14 illustrated in FIG. 1) via terminals 210. The transmitting coil 208 can be wirelessly coupled to a receiving coil (not shown) such as the receiving coil 20 illustrated in FIG. 1. The transmitting coil 208 can overlay a third shield 212, which could be employed to implement, for example, the third shield 212 illustrated in FIG. 1. The third shield 212 can have a disc shape and can be in direct contact with the transmitting coil 208. While in the present example, the third shield 212 is described as being implemented with ferrite, as explained above, in other examples; the third shield 212 can be formed from another soft ferromagnetic material that has a magnetic permeability greater than one. Moreover, the third shield 212 can have a high specific (e.g., electrical) resistance. The third shield 212 can facilitate confinement of a magnetic field induced from a return side of the transmitting coil 208. Further, the third shield 212 can allow the transmitting coil 208 to be positioned on or near a metal surface and/or upon electronics employed in the transmitter 200.

Additionally, a fourth shield 214 can be included on the transmitter 200. The fourth shield 214 can be employed to implement the fourth shield 214 illustrated in FIG. 1. The fourth shield 214 can be implemented as a metal plate, film or a screen. The fourth shield 214 can underlay the third shield 212. That is, the fourth shield 214 can be positioned between the transmitting coil 208 and the source 202. The fourth shield 214 can be formed from a material with a high conductivity, such as copper or aluminum. The fourth shield 214 can be connected to an electrically neutral point (e.g., electrical ground or chassis ground). The fourth shield 214 can be as large as or larger than the third shield 212.

FIG. 11 illustrates the transmitter 200 illustrated in FIG. 10 wherein a first and second shield 216 are mounted on the transmitter 200 and overlay the transmitting coil 208 and a fifth shield 218 that houses the transmitter 200. For purposes of simplification of explanation, the same reference numbers are employed in FIGS. 10 and 11 to denote the same structure. The first and second shields 216 can be implemented, for example, as the first and second shield 100 and 102 illustrated in FIG. 5. In such an example, the first shield and second shields 216 can reside on a substrate formed of a sheet of insulating material. The first and second shields 216 can have traces (e.g., conductive traces) forming a pattern that has a comb shape. The pattern can ensure that the traces do not form a closed electrical loop, as explained herein. Moreover, the traces of the first and second shields 216 can be formed of a conductive material (e.g., copper or aluminum). The first shield can be formed on a given side of the substrate and can overlay the transmitting coil 208. Moreover, the first shield can be spaced apart from the transmitting coil 208 by a distance, for example, greater than 0 mm and of up to about 3 mm.

The second shield can be formed on another side (not shown) of the substrate, the other side of the substrate opposing the given side of the substrate. As explained with respect to FIG. 5, the second shield can be offset from the first shield such that the traces of first and second shields 216 can form an interleaving pattern such that the interleaving pattern overlays substantially an entire footprint of the transmitting coil 208. The first and second shields 216 can have a surface area larger than the third and/or fourth shields 216, 212 and 214.

The fifth shield 218 can house the transmitter 200 and can include an opening for exposing the transmitting coil 208 to the receiving coil. The fifth shield 218 can be formed of a conductive material, such as copper or aluminum. The fifth shield 218 can have a relatively uniform density. In some examples, the fifth shield 218 can be implemented as the fifth shield 32 illustrated in FIG. 1. By employment of the transmitter 200 illustrated in FIGS. 10 and 11, EMI transmitted from the transmitting coil 208 can be attenuated and/or eliminated. Moreover, since the first-fifth shields 216, 212, 214 and 218 only attenuates a magnetic field induced by the transmitting coil 208 by a relatively small amount (e.g., about 2% or less), a relatively high efficiency wireless power transmitting system can be achieved.

Figure 12:
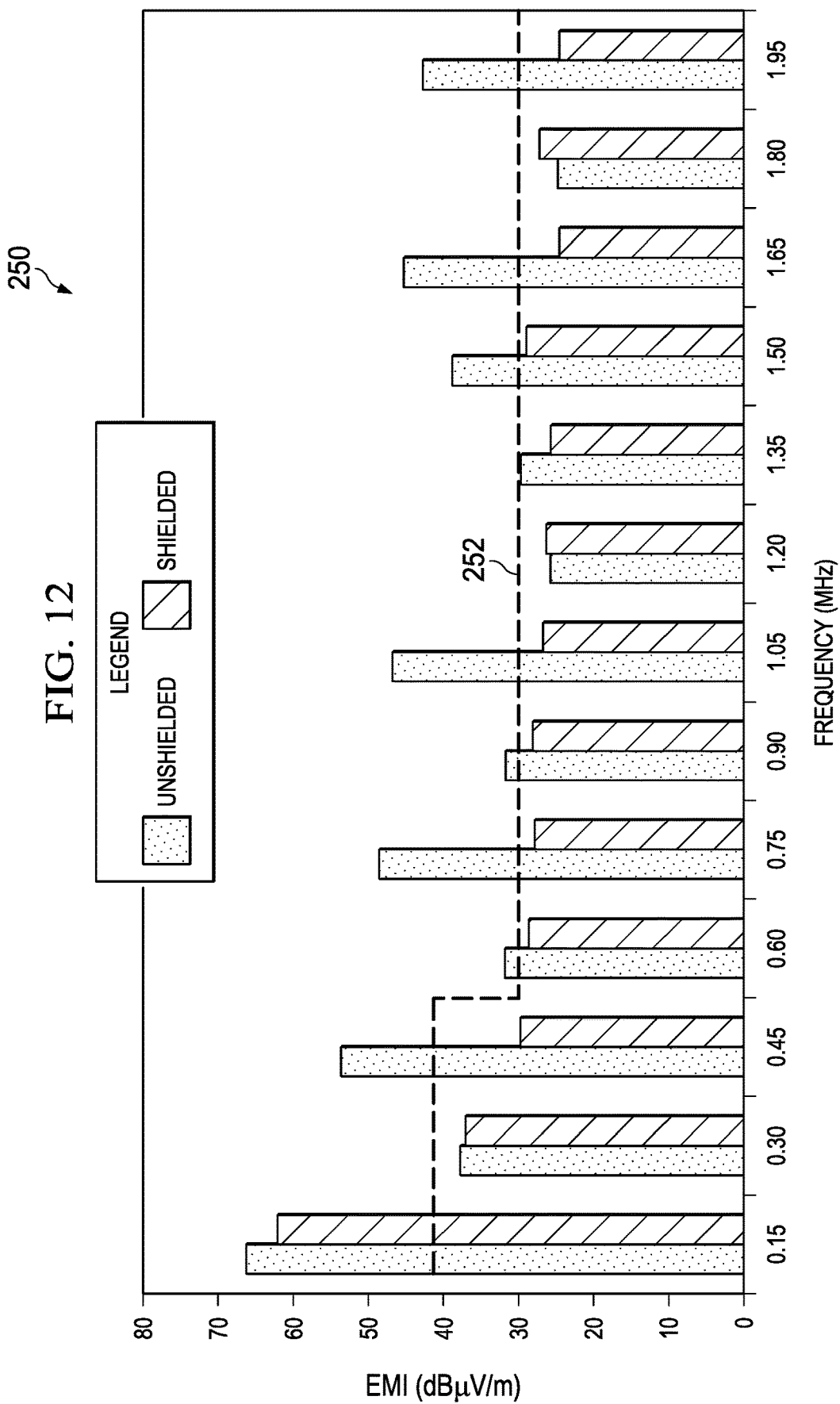
FIG. 12 illustrates an example of a bar graph plotting electromagnetic interference, measured in decibel microVolts per meter (dBµV/m), plotted as a function of frequency, in Megahertz (MHz), for a wireless power transfer system.

FIG. 12 illustrates an example of a bar graph 250 including a line depicting EMI, measured in decibel micro volts per meter (dBµV/m) plotted as a function of frequency in Megahertz (MHz) of a transmitter that employs no shielding (labeled in FIG. 12 as "UNSHIELDED"). The bar graph 250 also includes a line depicting EMI measured in decibel micro volts per meter (dBµV/m) plotted as a function of frequency in Megahertz (MHz) of a transmitter (e.g., the transmitter 4 illustrated in FIG. 1) for a wireless power transfer system that employs first, second, third, fourth and fifth shields, such as the first second, third, fourth and fifth shields 22, 24, 28, 30 and 32 described with respect to FIG. 1 (labeled in FIG. 12 as "SHIELDED"). The graph 250 also includes a line 252 representing the maximum permissible limits of EMI defined by Comité International Spécial des Perturbations Radioélectriques, section 25 (CISPR 25) for use in an automobile. As illustrated in FIG. 12, the measured EMI of the transmitter falls below the maximum permissible limits of EMI defined by CISPR 25 for frequencies of about 0.2 MHz to above 2 MHz when the first through fifth shields 22, 24, 28, 30 and 32 are applied. Moreover, as illustrated in graph 252, the measured EMI of the transmitter falls below about 30 dBµV/m for frequencies above about 0.6 MHz upon application of the first through fifth shields 22, 24, 28, 30 and 32. Additionally, employment of the first through fifth shields 22, 24, 28, 30 and 32 can reduce the EMI by about 6 dB for third and higher harmonics of an operating frequency of a transmitting coil.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A wireless power transmitter comprising:
    a source;
    a transmission coil coupled to the source; and
    a shield adjacent to the transmission coil and away from the source, the shield including:
    a substrate having a first side and a second side opposite the first side;
    a first conductive layer on the first side of the substrate, the first conductive layer having a first base, and first traces spaced apart from each other, each of the first traces having: a respective first end extended from the first base; and a respective second end distal from the first base; and
    a second conductive layer on the second side of the substrate, the second conductive layer having a second base, and second traces spaced apart from each other, each of the second traces having: a respective third end extended from the second base; and a respective fourth end distal from the second base, the second traces interleaving the first traces along a plane of the substrate.

2. The wireless power transmitter of claim 1, wherein the first base overlaps the second base.

3. The wireless power transmitter of claim 1, wherein each of the first and second traces is curved.

4. The wireless power transmitter of claim 1, wherein:
    the first traces coextend with each other and are spaced apart from each other by a first space;
    the second traces coextend with each other and are spaced apart from each other by a second space;
    the first space overlaps with the second traces; and
    the second space overlaps with the first traces.

5. The wireless power transmitter of claim 1, wherein the shield is a first shield, and the wireless power transmitter further comprises:
    a second shield between the transmission coil and the source, the second shield comprising a disc of ferrite, wherein the transmission coil is between the first shield and the second shield.

6. The wireless power transmitter of claim 5, further comprising:
    a third shield housing the source and the transmission coil, and having an opening that exposes the transmission coil.

7. The wireless power transmitter of claim 1, wherein the shield is between the transmission coil and a reception coil of a wireless power receiver.

8. A wireless power transmitter comprising:
    a source;
    a transmission coil coupled to the source;
    a housing enclosing the source and the transmission coil, and having an opening that exposes the transmission coil; and
    a shield adjacent to the transmission coil, the shield including:
    a substrate having a first side and a second side opposite the first side;
    a first conductive layer on the first side of the substrate, the first conductive layer having a first base, and first traces spaced apart from each other, each of the first traces having: a respective first end extended from the first base; and a respective second end distal from the first base; and
    a second conductive layer on the second side of the substrate, the second conductive layer having a second base, and second traces spaced apart from each other, each of the second traces having: a respective third end extended from the second base; and a respective fourth end distal from the second base, the second traces interleaving the first traces along a plane of the substrate.

9. The wireless power transmitter of claim 8, wherein the first base overlaps the second base.

10. The wireless power transmitter of claim 8, wherein each of the first and second traces is curved.

11. The wireless power transmitter of claim 8, wherein:
    the first traces coextend with each other and are spaced apart from each other by a first space;
    the second traces coextend with each other and are spaced apart from each other by a second space;
    the first space overlaps with the second traces; and
    the second space overlaps with the first traces.

12. The wireless power transmitter of claim 8, wherein the shield is a first shield, and the wireless power transmitter further comprises:
    a second shield between the transmission coil and the source, the second shield comprising a disc of ferrite, wherein the transmission coil is between the first shield and the second shield.

13. The wireless power transmitter of claim 8, wherein the shield is between the transmission coil and a reception coil of a wireless power receiver.

* * * * *